United States Patent
Choi et al.

(10) Patent No.: US 9,625,910 B2
(45) Date of Patent: Apr. 18, 2017

(54) LANE CHANGING APPARATUS AND METHOD OF AUTONOMOUS VEHICLE

(71) Applicant: Hyundai Motor Company, Seoul (KR)

(72) Inventors: Tae Sung Choi, Sacheon-si (KR); Byung Yong You, Suwon-si (KR); Sung Won Yoon, Yongin-si (KR); Chang Young Jung, Busan (KR)

(73) Assignee: Hyundai Motor Company, Seoul (KR)

( * ) Notice: Subject to any disclaimer, the term of this patent is extended or adjusted under 35 U.S.C. 154(b) by 93 days.

(21) Appl. No.: 14/526,147

(22) Filed: Oct. 28, 2014

(65) Prior Publication Data
US 2015/0355641 A1 Dec. 10, 2015

(30) Foreign Application Priority Data
Jun. 5, 2014 (KR) .................... 10-2014-0068542

(51) Int. Cl.
| | | |
|---|---|---|
| *B60W 40/114* | (2012.01) | |
| *G05D 1/02* | (2006.01) | |
| *B60W 30/18* | (2012.01) | |
| *B62D 15/02* | (2006.01) | |
| *B60W 30/12* | (2006.01) | |

(52) U.S. Cl.
CPC ....... *G05D 1/021* (2013.01); *B60W 30/18163* (2013.01); *B60W 40/114* (2013.01); *B62D 15/0255* (2013.01); *B60W 30/12* (2013.01)

(58) Field of Classification Search
None
See application file for complete search history.

(56) References Cited

U.S. PATENT DOCUMENTS

| | | | | |
|---|---|---|---|---|
| 5,947,221 A | * | 9/1999 | Taniguchi | B60T 8/4872 180/197 |
| 8,190,330 B2 | * | 5/2012 | Lee | B62D 1/28 342/71 |
| 2004/0193374 A1 | * | 9/2004 | Hac | B60K 31/0008 701/301 |

(Continued)

FOREIGN PATENT DOCUMENTS

| | | |
|---|---|---|
| JP | H09-301210 A | 11/1997 |
| JP | 2989651 B2 | 12/1999 |

(Continued)

*Primary Examiner* — Shelley Chen
(74) *Attorney, Agent, or Firm* — McDermott Will & Emery LLP

(57) ABSTRACT

A lane changing apparatus of an autonomous vehicle includes a lane recognizer, a vehicle information collector, a control information calculator, a controller and a steering apparatus. The lane recognizer is configured to recognize a lane of a road on which the vehicle is driving and extract road information from the recognized lane. The vehicle information collector is configured to collect vehicle information by a variety of sensors installed in the vehicle. The control information calculator is configured to calculate control information for changing the lane by using the vehicle information and the road information. The controller is configured to control a yaw rate of the vehicle based on the control information upon changing the lane. The steering apparatus is configured to change a moving direction of the vehicle according to a control of the controller.

10 Claims, 3 Drawing Sheets

(56) References Cited

U.S. PATENT DOCUMENTS

| | | | | |
|---|---|---|---|---|
| 2006/0041356 A1* | 2/2006 | Shirato | .................... | B62D 1/28 |
| | | | | 701/41 |
| 2010/0211235 A1* | 8/2010 | Taguchi | .................... | B60T 7/22 |
| | | | | 701/1 |
| 2013/0190982 A1* | 7/2013 | Nakano | .................... | B62D 6/00 |
| | | | | 701/41 |
| 2013/0190983 A1* | 7/2013 | Tatsukawa | ............... | B62D 6/00 |
| | | | | 701/41 |
| 2013/0190984 A1* | 7/2013 | Kawai | .................. | B62D 15/025 |
| | | | | 701/41 |
| 2013/0190985 A1* | 7/2013 | Nakano | .................... | B62D 6/00 |
| | | | | 701/41 |
| 2014/0129084 A1* | 5/2014 | Lee | ........................ | G08G 1/167 |
| | | | | 701/41 |

FOREIGN PATENT DOCUMENTS

| | | | | |
|---|---|---|---|---|
| JP | 2008-044561 A | | 2/2008 | |
| JP | 2008044561 A | * | 2/2008 | |
| KR | 10-1356203 B1 | | 1/2014 | |
| KR | 10-2014-0058254 A | | 5/2014 | |
| KR | 20140058254 A | * | 5/2014 | ............. G08G 1/167 |

* cited by examiner

LANE CHANGING APPARATUS AND METHOD OF AUTONOMOUS VEHICLE

CROSS-REFERENCE TO RELATED APPLICATION

This application is based on and claims the benefit of priority to Korean Patent Application No. 10-2014-0068542, filed on Jun. 5, 2014 in the Korean Intellectual Property Office, the entire content of which is incorporated herein by reference.

TECHNICAL FIELD

The present inventive concept relates to a lane changing apparatus and method of an autonomous vehicle, and more particularly, to a lane changing apparatus and method of autonomous vehicle capable of allowing the autonomous vehicle to actively change a lane.

BACKGROUND

In general, an autonomous vehicle is referred to as an intelligent vehicle that improves driving stability and convenience by recognizing a driving environment to assist the driving or drive by itself. A lane changing technology that is mainly used for the autonomous vehicle according to the related art estimates a current position and a moving direction (heading) of the vehicle by using dead reckoning using sensors inside the vehicle such as an odometer and a magnetic compass which are mounted in the vehicle. In addition, the autonomous vehicle generates a path for changing the lane from the estimated current position and the moving direction of the vehicle and follows the generated path.

As such, according to the related art that predicts the current position and the moving direction of the vehicle by using the sensors inside the vehicle, only if the sensor having high precision is used, the current position and the moving direction of the vehicle may be accurately predicted.

SUMMARY

The present inventive concept has been made to solve the above-mentioned problems occurring in the prior art while advantages achieved by the prior art are maintained intact.

An aspect of the present inventive concept provides a lane changing apparatus and method of an autonomous vehicle that changes a lane by using yaw rate information and a velocity of the vehicle upon changing the lane to calculate a target yaw rate and transition timing information for changing the lane and controlling a yaw rate of the vehicle based on the calculated target yaw rate and transition timing information.

One aspect of the present inventive concept relates to a lane changing apparatus of an autonomous vehicle including a lane recognizer, a vehicle information collector, a control information calculator, a controller and a steering apparatus. The lane recognizer is configured to recognize a lane of a road on which the vehicle is driving and extract road information from the recognized lane. The vehicle information collector is configured to collect vehicle information by a variety of sensors installed in the vehicle. The control information calculator is configured to calculate control information for changing the lane by using the vehicle information and the road information. The controller is configured to control a yaw rate of the vehicle based on the control information upon changing the lane. The steering apparatus is configured to change a moving direction of the vehicle according to a control of the controller.

The lane recognizer may be configured to extract, from a front image photographed by an image sensor, the road information including a moving direction and a driving road of the vehicle, and a road width of the lane recognized, by performing an image-processing of the front image.

The vehicle information collector may be configured to collect the vehicle information by chassis-controller area network (CAN) communications with the variety of sensors.

The vehicle information may include a vehicle velocity, a steering angle, an accumulated steering angle, a yaw rate of the vehicle, a moving direction angle, and a lateral velocity.

The control information may include a target yaw rate and transition timing information.

The control information calculator may be configured to calculate the target yaw rate by using a vehicle velocity, a road width, and an allowable maximum moving direction angle.

The target yaw rate may include a first target yaw rate and a second target yaw rate. The first target yaw rate may be a yaw rate for controlling a steering from a starting road on which the vehicle starts a lane change in a direction toward a target road to be changed, and the second target yaw rate may be a yaw rate for controlling the steering from the target road in a direction toward the starting road.

The transition timing information may be a target yaw rate transition timing calculated by using a lateral velocity of the vehicle and a road width.

The controller may be configured to control the steering from the starting road in the direction toward the target road by controlling the yaw rate of the vehicle to be set to the first target yaw rate upon changing the lane.

The controller may be configured to control the steering from the target road in the direction toward the starting road by changing and setting the first target yaw rate to the second target yaw rate when the vehicle deviates from the center of the starting road by a first limit distance.

The controller may be configured to enter a lane deviation preventing mode by changing and setting the second target yaw rate to zero when the vehicle enters within a second limit distance from the center of the target road.

The control information calculator may be configured to calculate a target yaw rate and transition timing information by taking account of an average yaw rate until just before the lane change, and curvature and gradient of a curved lane when the vehicle is driving on the curved road.

Another aspect of the present inventive concept encompasses a lane changing method of an autonomous vehicle including calculating control information by using vehicle information and road information obtained by a variety of sensors installed in a vehicle upon performing a lane change while driving. A steering of the vehicle is controlled from a starting road to a direction of a target road based on the control information. It is determined whether or not the vehicle arrives at a first limit point by the steering control. A yaw rate of the vehicle is controlled to steer the vehicle from the target road in a direction toward the starting road based on the control information when it is determined that the vehicle arrives at the first limit point. It is determined whether or not the vehicle arrives at a second limit point. A moving of the vehicle is matched to a moving direction of the vehicle along the target lane by controlling the yaw rate of the vehicle when it is determined that the vehicle arrives at the second limit point.

In the calculating of the control information, a target yaw rate may be calculated by using a vehicle velocity, a road width, and an allowable maximum moving direction angle.

In the calculating of the control information, the first and second limit points at which the target yaw rate transitions may be calculated by using a lateral velocity of the vehicle and a road width.

The first limit point may be a point spaced apart from a center of the starting road on which the vehicle attempts the lane change by a first limit distance in the direction toward the target road to be changed.

The second limit point may be a point spaced apart from a center of the target road to be changed by the vehicle by a second limit distance in the direction toward the starting road on which the vehicle attempts the lane change.

In the calculating of the control information, a target yaw rate and transition timing information may be calculated by taking account of an average yaw rate until just before the lane change, and curvature and gradient of a curved lane when the vehicle is driving on the curved road.

BRIEF DESCRIPTION OF THE DRAWINGS

The above and other objects, features and advantages of the present inventive concept will be more apparent from the following detailed description taken in conjunction with the accompanying drawings.

DETAILED DESCRIPTION

Hereinafter, exemplary embodiments of the present inventive concept will be described with reference to the accompanying drawings.

According to an embodiment of the present inventive concept, a lane change may be performed by the same steering control pattern as that performed when a driver performs the lane change. In other words, according to an embodiment of the present inventive concept, a vehicle may be controlled such that when changing lanes, the vehicle is first steered toward a direction of a target lane to change a heading (e.g., a moving direction) of the vehicle, and then, when the vehicle is horizontally moved by a predetermined distance from an initial location, the vehicle is steered toward the direction opposite to the direction of the target road to change the heading of the vehicle to match a moving direction of the vehicle along the target road.

Figure 1:
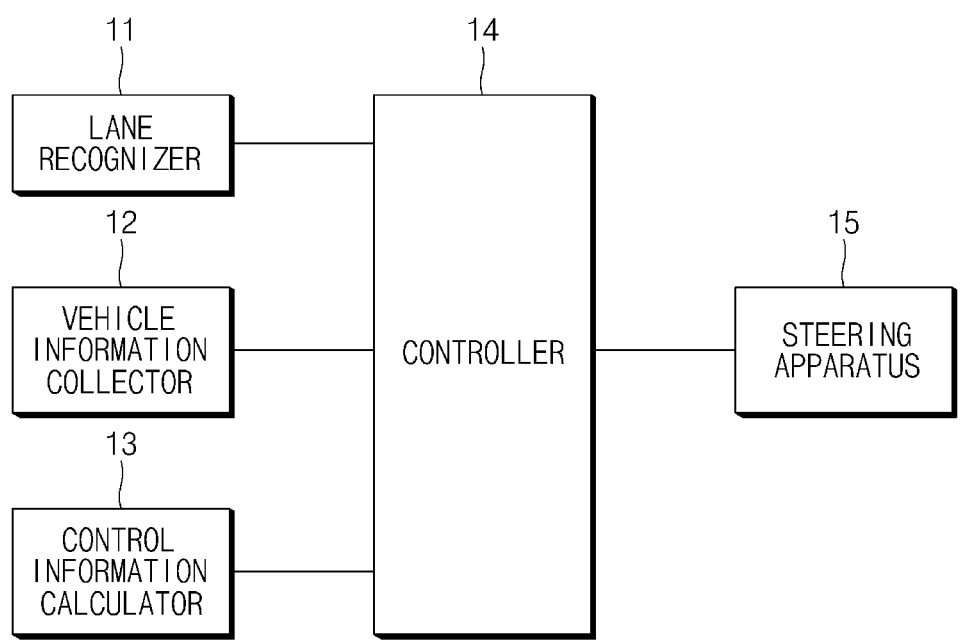
FIG. 1 is a block configuration diagram of a lane changing apparatus of an autonomous vehicle according to an exemplary embodiment of the present inventive concept.
Figure 2:
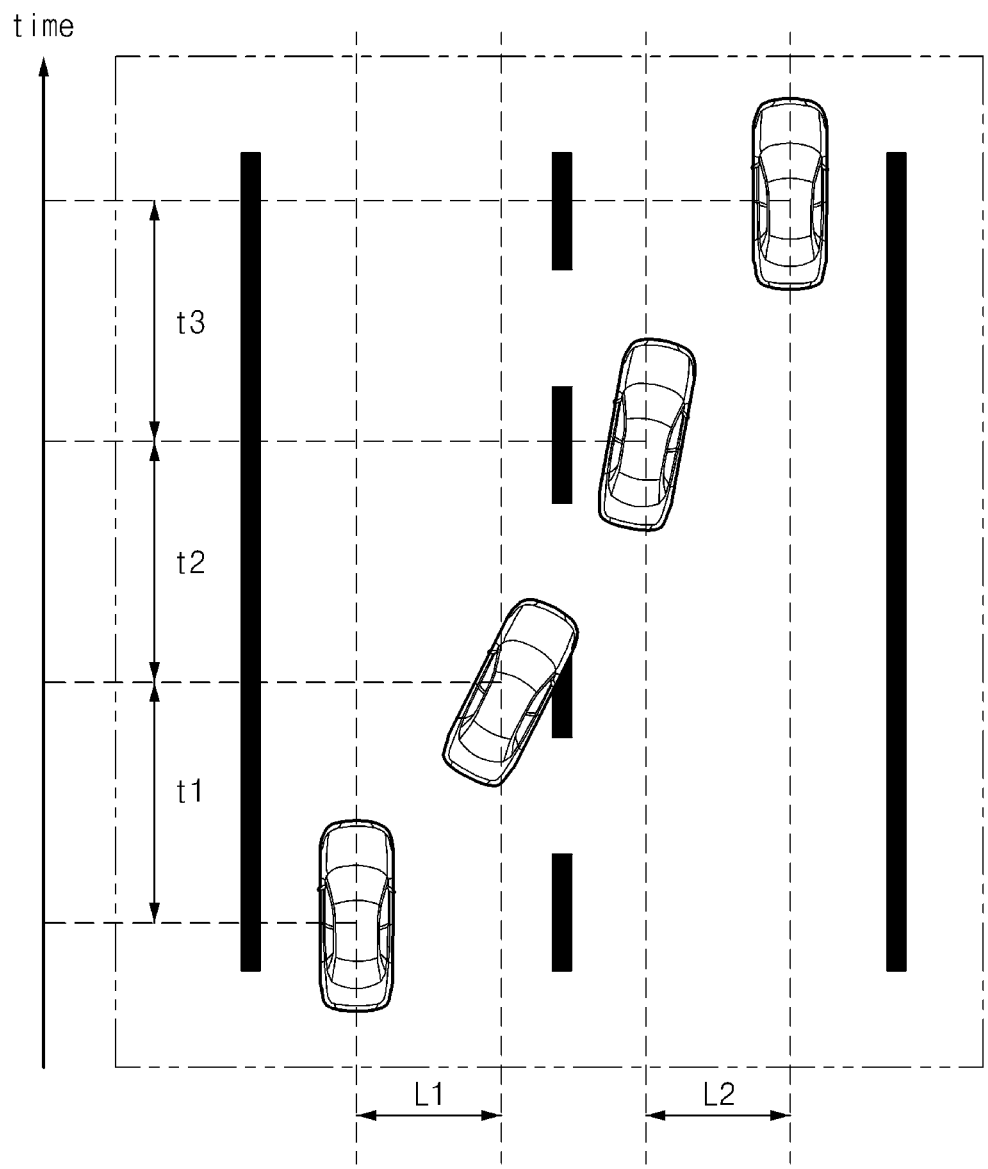
FIG. 2 is an illustrative diagram showing a control transition timing related to the present inventive concept.

FIG. 1 is a block configuration diagram of a lane changing apparatus of an autonomous vehicle according to an exemplary embodiment of the present inventive concept and FIG. 2 is an illustrative diagram showing a control transition timing related to the present inventive concept.

As shown in FIG. 1, the lane changing apparatus 10 of the autonomous vehicle includes a lane recognizer 11, a vehicle information collector 12, a control information calculator 13, a controller 14, and a steering apparatus 15.

The lane recognizer 11 may recognize a lane of a road on which the vehicle is driving, by an image sensor (not shown). Here, the image sensor may be implemented in a camera, a video camera, a charge coupled device (CCD) camera, a monocular camera, or the like.

In addition, the lane recognizer 11 may extract the lane from a front image photographed by the image sensor by image-processing the front image and obtain road information such as a moving direction and a driving road of the vehicle, a road width, and the like through the extracted lane.

The vehicle information collector 12 may collect vehicle information measured by a variety of sensors installed in the vehicle through data communications. In this case, the vehicle information collector 12 may perform the data communications with the variety of sensors by chassis-controller area network (CAN) communications.

Here, the variety of sensors may be implemented as a vehicle velocity sensor, a steering angle sensor, an accumulated steering angle sensor, a yaw rate sensor, a heading sensor, a lateral acceleration sensor, or the like. In addition, the vehicle information may include a vehicle velocity, a steering angle, an accumulated steering angle, a yaw rate of a vehicle, a heading angle (e.g., azimuth), a lateral velocity, and the like.

The control information calculator 13 may calculate control information necessary to perform the lane change using the vehicle information provided from the vehicle information collector 12. The control information may include a target yaw rate and transition timing information.

The control information calculator 13 may calculate the target yaw rate $Y_{tar}$ by using Equation 1 when the vehicle is driving on a straight road.

$$Y_{tar} \leq \pm \sqrt{\frac{2 \cdot v_{veh} \cdot \theta_{th}^3}{3 \cdot L_{lane}}} \quad \text{[Equation 1]}$$

where, $v_{veh}$ is the vehicle velocity, $L_{lane}$ is the road width, and $\theta_{th}$ is an allowable maximum heading angle. The allowable maximum heading angle (e.g., an angle formed by a highest point of the heading) is a maximum angle at which the lane may be recognized by the image sensor (e.g., the camera).

The transition timing information may include a first limit distance $L_1$ and a second limit distance $L_2$ for distinguishing a steering changing timing (e.g., a target yaw rate changing timing) for changing the lane. Here, the first limit distance $L_1$ is a straight distance from a center of a starting road on which the vehicle is positioned upon starting the lane change in a direction toward a target road to be changed, and the second limit distance $L_2$ is a straight distance from a center of the target road to be changed in a direction toward the starting road.

The control information calculator 13 may each calculate the first limit distance $L_1$ and the second limit distance $L_2$ by using the following Equations 2 and 3.

$$L_1 = \frac{L_{lane}}{2} - \int_0^{t_{tran \cdot 1}} v_{veh \cdot h}(t) \cdot dt \quad \text{[Equation 2]}$$

$$L_2 = \int_0^{t_{tran \cdot 2}} v_{veh \cdot h}(t) \cdot dt \quad \text{[Equation 3]}$$

where, $t_{tran.1}$ and $t_{tran.2}$ are transition times, during which the target yaw rate changes. The first transition time $t_{tran.1}$ represents a time taken to change a first target yaw rate $Y_{tar}^+$ to a yaw rate of '0' for steering the vehicle in a particular direction (e.g., a right direction), and the second transition time $t_{tran.2}$ represents a time taken to change a second target yaw rate $Y_{tar}^-$ to the yaw rate of '0' for steering the vehicle in a direction (e.g., a left direction) opposite to the particular direction.

The first transition time $t_{tran.1}$ and the second transition time $t_{tran.2}$ may be obtained by using the following Equations 4 and 5.

$$t_{tran.1} = \tau_{proc} + \frac{Y_{tar}^+}{y_{res}}$$ [Equation 4]

$$t_{tran.2} = \tau_{proc} + \frac{Y_{tar}^-}{y_{res}}$$ [Equation 5]

where, $\tau_{proc}$ is a yaw rate control processing time and $y_{res}$ is a response velocity °/s² of the vehicle.

In addition, $v_{veh.h}$ is a horizontal direction velocity (lateral velocity) of the vehicle and may be calculated by using the following Equation 6.

$$v_{veh.h}(t) = \begin{cases} v_{veh} \cdot \sin(\theta_0 + Y_{tar} \cdot t) \approx v_{veh} \cdot (\theta_0 + Y_{tar} \cdot t) & 0 \leq t < t_{proc} \\ v_{veh} \cdot \sin\left(\theta_0 - \frac{3}{2}y_{res} \cdot \tau_{proc}^2 + t \cdot \right. \\ \left. (Y_{tar} + y_{res} \cdot \tau_{proc}) - \frac{1}{2}y_{res}t^2\right) \approx \\ v_{veh} \cdot \left(\theta_0 - \frac{3}{2}y_{res} \cdot \tau_{proc}^2 + t \cdot \right. & \tau_{proc} \leq t < t_{tran.1} \\ \left. (Y_{tar} + y_{res} \cdot \tau_{proc}) - \frac{1}{2}y_{res}t^2\right) \end{cases}$$ [Equation 6]

where, $\theta_0$ is a heading (e.g., moving direction) of the vehicle immediately before a transition occurs, $\tau_{proc}$ is a processing time, and $y_{res}$ is a response velocity of the vehicle.

Referring to FIG. 2, the transition timing of the target yaw rate may be a timing (e.g., a time t1) during which the lane change is started (e.g., a timing at which the target yaw rate is changed from '0' to $Y_{tar}^+$), a timing (e.g., a time t2) during which the vehicle deviates by the first limit distance from the center of the driving road (the starting road) in the direction toward the target road (e.g., a timing at which the target yaw rate is changed from $Y_{tar}^+$ to $Y_{tar}^-$), and a timing (e.g., a time t3) at which the vehicle enters a point spaced apart from the center of the target road by the second limit distance in the direction toward the starting road (e.g., a timing at which the yaw rate is changed from $Y_{tar}^-$ to '0').

When the vehicle performs the lane change while it is driving on a curved road, the control information calculator 13 may determine an initial yaw rate of the vehicle by utilizing an average yaw rate (until just before the lane change) and an equation of a currently recognized lane (reflecting curvature and gradient).

That is, a heading of the vehicle which is driving may be expressed as in Equation 7.

$$\theta_{h,t_0} = Y_{tar} \cdot t_0 + Y_{0.veh}$$ [Equation 7]

where, $t_0$ is a time past after the lane change is started and $Y_{0.veh}$ is an initial yaw rate of the vehicle.

In addition, the control information calculator 13 may calculate the target yaw rate $Y_{tar}^+$ for controlling the steering in one direction by using Equation 1 and calculate the target yaw rate $Y_{tar}^-$ for controlling the steering in a direction opposite to one direction by using Equation 8.

$$Y_{tar}^- = -Y_{tar}^+ + Y_{0.veh}$$ [Equation 8]

The controller 14 may control the yaw rate of the vehicle so that the yaw rate of the vehicle matches the target yaw rate by comparing the target yaw rate and the yaw rate of the vehicle with each other upon changing the lane. In addition, the controller 14 may set the first target yaw rate for controlling the steering in the direction toward the target road upon starting the lane change, and may change and set the first target yaw rate to the second target yaw rate for controlling the steering in the direction toward the starting road when the vehicle deviates by the first limit distance in the horizontal direction from the center of the starting road, on which the vehicle attempts to change the lane toward the target road to be changed. Meanwhile, when the vehicle enters within the second limit distance from the center of the target road to the starting road, the controller 14 may change and set the second yaw rate to '0' and enter a lane maintaining (e.g., lane deviation preventing) mode.

The steering apparatus 15 may change the moving direction of the vehicle by controlling the yaw rate of the vehicle according to the control of the controller 14. The steering apparatus 15 may include a steering wheel, a steering shaft, a steering gear, a pitman arm, a drag link, a tie rod, a steering knuckle arm, a steering knuckle, and the like.

Figure 3:
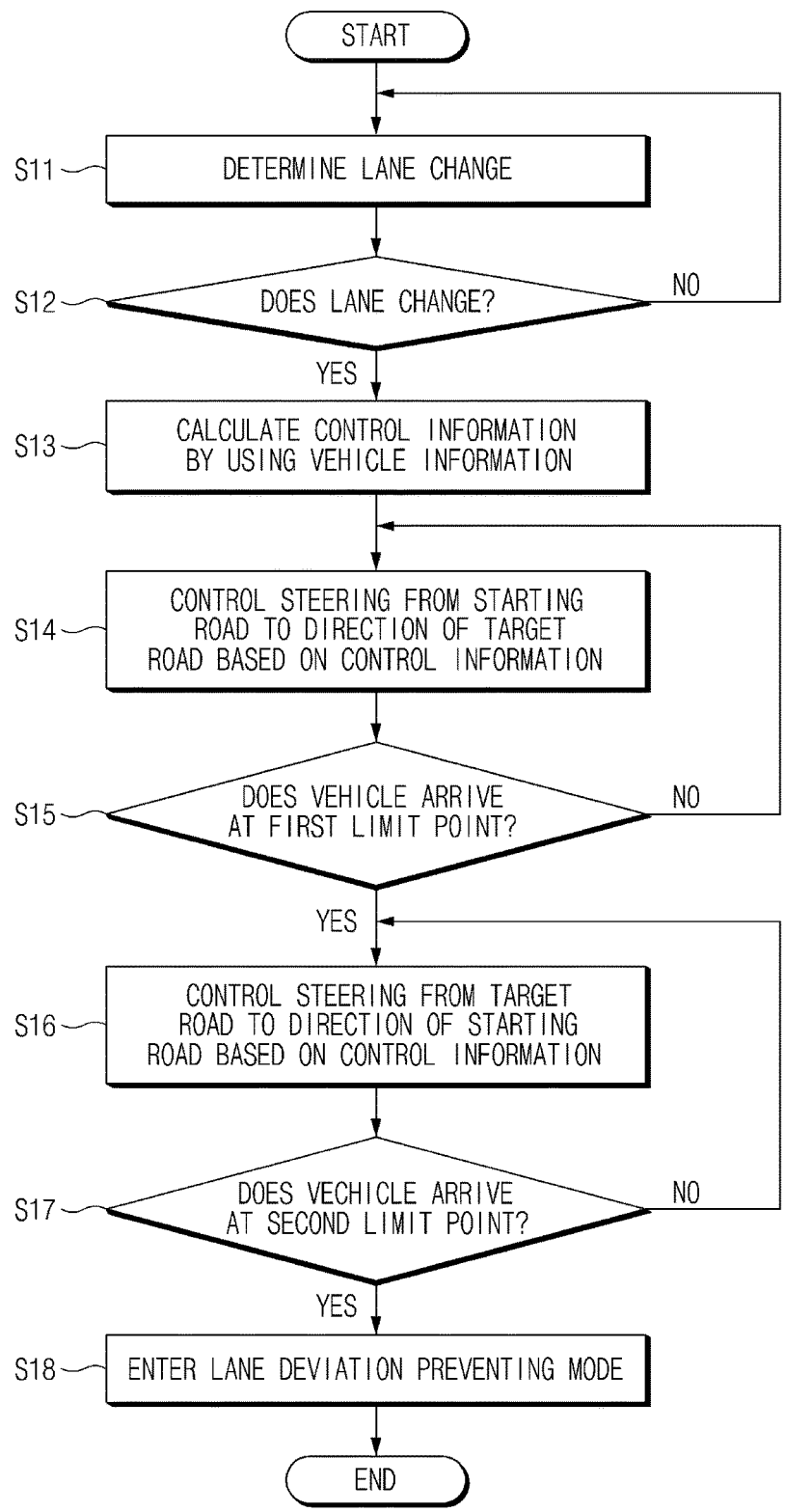
FIG. 3 is a flow chart showing a lane changing method of an autonomous vehicle according to an exemplary embodiment of the present inventive concept.

FIG. 3 is a flow chart showing a lane changing method of an autonomous vehicle according to an exemplary embodiment of the present inventive concept.

Referring to FIG. 3, the controller 14 of the lane changing apparatus 10 of the autonomous vehicle may determine whether or not the lane is changed, by taking account of driving environment detected by a variety of sensors (e.g., a distance sensor, an image sensor, and the like) (S11). For example, the controller 14 may determine the lane change if there is a risk that the vehicle may collide with a front vehicle.

If the controller 14 determines the lane change, the controller 14 may calculate the control information such as the target yaw rate and the transition timing information by controlling the control information calculator 13 (S12 and S13). The control information calculator 13 may calculate the target yaw rate and the transition timing information by using the road information received from the lane recognizer 11 and the vehicle information collected by the vehicle information collector 12. Here, the target yaw rate may include the first target yaw rate for controlling the steering from the starting road on which the vehicle attempts to change the lane in the direction toward the target road to be changed and the second target yaw rate for controlling the steering from the target road in the direction toward the starting road.

The controller 14 may control the steering of the vehicle from the starting road in the direction toward the target road based on the control information (S14). The controller 14 may change and set the target yaw rate from '0' to the first target yaw rate. In addition, the controller 14 may control the steering apparatus 15 so that the yaw rate of the vehicle matches the first target yaw rate.

The controller 14 may check whether or not the vehicle arrives at a first limit point (S15). Here, the first limit point means a point spaced apart from the center of the starting road on which the vehicle starts the lane change by the first limit distance in the direction toward the target road. That is, the controller 14 may check whether or not the vehicle horizontally, e.g., in a direction perpendicular to the direction of lanes, deviates from the center of the starting road to the target road by the first limit distance.

If the vehicle arrives at the first limit point, the controller 14 may control the steering of a vehicle body from the target road in the direction toward the starting road based on the control information (S16). If the vehicle horizontally deviates from the center of the starting road by the first limit distance, the controller 14 may change the first target yaw rate to the second target yaw rate. In addition, the controller 14 may control the yaw rate of the vehicle by controlling the steering apparatus 15 to control the second target yaw rate.

Next, the controller 14 may check whether or not the vehicle arrives at a second limit point (S17). Here, the second limit point means a point spaced apart from the center of the target road by the second limit distance in the direction of the starting road. That is, the controller 14 may check whether or not the vehicle enters within the second limit distance from the center of the target road.

If the vehicle arrives at the second limit point, the controller 14 may enter the lane deviation preventing mode and control the vehicle so as not to deviate from a lane of the target road (S18). Here, if the vehicle enters the second limit point of the target road, the controller 14 may change and set the target yaw rate from the second target yaw rate to '0'. In addition, the controller 14 may match the heading of the vehicle to the moving direction thereof along the target lane by controlling the steering apparatus 15.

According to the exemplary embodiment of the present inventive concept, the lane may be changed by using the velocity and yaw rate information of the vehicle upon changing the lane to calculate the target yaw rate and transition timing information for changing the lane and controlling the yaw rate of the vehicle based on the calculated target yaw rate and transition timing information.

In addition, according to the exemplary embodiment of the present inventive concept, since the lane change is controlled by the same steering control pattern as that performed when the driver actually changes the lane, the lane change may be more stably performed and the driver and the drivers of the surrounding vehicles may feel less apprehension.

In the above description, the present inventive concept has been described through specific examples, but it may be well understood that various modifications can be made without departing from the scope of the present inventive concept. Therefore, the scope of the present inventive concept is not limited to the above described embodiments, and it should be defined by the appended claims and their equivalents. When taking the foregoing description into account, if the modifications and variations of the present inventive concept fall within the following claims and their equivalents, then it is construed that the present inventive concept includes these modifications and variations.

What is claimed is:

1. A lane changing apparatus of an autonomous vehicle, the lane changing apparatus comprising:
   a lane recognizer configured to extract road information for a road on which the vehicle is driving;
   a vehicle information collector configured to collect vehicle information by a variety of sensors installed in the vehicle;
   a control information calculator configured to calculate control information for changing a lane by using the vehicle information and the road information;
   a controller configured to control a yaw rate of the vehicle based on the control information upon changing the lane; and
   a steering apparatus configured to change a moving direction of the vehicle according to a control of the controller,
   wherein the control information includes a target yaw rate and transition timing information, and
   wherein the control information calculator determines an initial yaw rate of the vehicle by using an average yaw rate until just before a lane change, and curvature and gradient of a curved lane when the vehicle is driving on the curved road, and calculates the target yaw rate by taking account of the initial yaw rate of the vehicle.

2. The lane changing apparatus according to claim 1, wherein the lane recognizer is configured to extract, from a front image photographed by an image sensor, the road information including a moving direction and a driving road of the vehicle, and a road width of the lane recognized, by performing an image-processing of the front image.

3. The lane changing apparatus according to claim 1, wherein the vehicle information collector is configured to collect the vehicle information by chassis-controller area network (CAN) communications with the variety of sensors.

4. The lane changing apparatus according to claim 1, wherein the vehicle information includes a vehicle velocity, a steering angle, an accumulated steering angle, a yaw rate of the vehicle, a moving direction angle, and a lateral velocity.

5. The lane changing apparatus according to claim 1, wherein the control information calculator is configured to calculate the target yaw rate by using a vehicle velocity, a road width, and an allowable maximum moving direction angle.

6. The lane changing apparatus according to claim 1, wherein the target yaw rate includes:
   a first target yaw rate for controlling a steering from a starting road on which the vehicle starts the lane change in a direction toward a target road to be changed, and
   a second target yaw rate for controlling the steering from the target road in a direction toward the starting road.

7. The lane changing apparatus according to claim 1, wherein the transition timing information is a target yaw rate transition timing calculated by using a lateral velocity of the vehicle and a road width.

8. The lane changing apparatus according to claim 6, wherein the controller is configured to control the steering from the starting road in the direction toward the target road by controlling the yaw rate of the vehicle to be set to the first target yaw rate upon changing the lane.

9. The lane changing apparatus according to claim 8, wherein the controller is configured to control the steering from the target road in the direction toward the starting road by changing and setting the first target yaw rate to the second target yaw rate when the vehicle deviates from the center of the starting road by a first limit distance.

10. The lane changing apparatus according to claim 9, wherein the controller is configured to enter a lane deviation preventing mode by changing and setting the second target yaw rate to zero when the vehicle enters within a second limit distance from the center of the target road.

* * * * *